United States Patent [19]

Bonnell et al.

[11] Patent Number: 5,048,333
[45] Date of Patent: Sep. 17, 1991

[54] MATERIAL LEVEL CHECKING APPARATUS FOR USE IN A ROTATING MEMBER

[75] Inventors: Ralph E. Bonnell, Dewey; Donald R. Engelbert, Copan, both of Okla.

[73] Assignee: Phillips Petroleum Company, Bartlesville, Okla.

[21] Appl. No.: 597,972

[22] Filed: Oct. 15, 1990

[51] Int. Cl.$^5$ .................. G01F 23/16; H01H 35/24
[52] U.S. Cl. ................... 73/290 R; 73/317; 110/246; 340/617; 432/32
[58] Field of Search ............. 73/290 R, 317; 116/227, 116/229, 200, 273, 275; 110/226, 227, 229, 246; 241/171, 176, 178, 179; 34/88; 340/617; 432/32, 45, 117, 118; 366/142

[56] References Cited

U.S. PATENT DOCUMENTS

| | | | |
|---|---|---|---|
| 25,816 | 10/1859 | Cummings | 73/290 R |
| 594,533 | 11/1897 | Henius | 366/142 X |
| 1,531,484 | 3/1925 | Hung | 73/290 R |
| 3,443,437 | 5/1969 | Skalka | 73/290 R |
| 3,510,861 | 5/1970 | McIver | 340/615 X |
| 4,188,186 | 2/1980 | Ladwig | 432/43 |
| 4,236,465 | 12/1980 | Matteini | 432/103 |

FOREIGN PATENT DOCUMENTS 929415  6/1955  Fed. Rep. of Germany.

Primary Examiner—William A. Cuchlinski, Jr.
Assistant Examiner—G. Bradley Bennett
Attorney, Agent, or Firm—David L. Kinsinger

[57] ABSTRACT

An apparatus and method for determining the level of material within a rotating cylindrical vessel are disclosed in which a rigid member means on the interior of the rotating vessel is fixedly secured to a rod having a longitudinal axis parallel to the rotational axis of the rotating vessel, and wherein the rod extends through one end wall of the vessle to the exterior at which it is fixedly secured to an indicator means. The rigid member means within the vessel is capable of resting at the top surface of the material within the vessel. As the level of material within the vessel is raised or lowered the rigid member means will rotate, thus causing an equal rotation of the rod and the indicator means on the exterior of the vessel. By monitoring the position of the indicator means, the level of material within the vessel can be determined.

19 Claims, 5 Drawing Sheets

1

MATERIAL LEVEL CHECKING APPARATUS FOR USE IN A ROTATING MEMBER

BACKGROUND OF THE INVENTION

The invention relates to a material level checking apparatus and method for a rotating vessel, and is more particularly concerned with a material level checking apparatus and method for a rotary calcination furnace.

When material is fed through a rotating vessel, such as a rotary calcination furnace, the material bed inside the rotating vessel will tend to climb upwardly along the ascending side of the vessel, until it reaches its normal angle for repose, and will then tumble toward the bottom of the rotating vessel by gravity. This phenomenon is known as "folding" of the material. Due to "folding", the level of material within a rotating vessel is difficult to measure. This difficulty in effectively measuring the level of material can result in excessive feed flow further resulting in backspill to the inlet of the rotating vessel and possible rupture of the ceiling means and loss of feed material.

SUMMARY OF THE INVENTION

It is one object of the invention to provide a reliable and simple material level indicator apparatus for determining the level of material within a rotating vessel that requires low maintenance and is capable of functioning at temperatures of up to 2000° F. and higher.

Another object of this invention is to provide a reliable and simple method for measuring the level of material within a rotating vessel having temperatures up to 2000° F. and higher.

In accordance with this invention, there is provided an apparatus comprising a rod aligned parallel with the axis of rotation of a rotating vessel and having a first end outside the rotating vessel and a second end inside the rotating vessel and having a rigid member means fixedly secured to the second end of the rod so as to extend radially outward from the longitudinal axis of the rod within substantially the same plane as that of the rod for engaging the surface of material within the rotating vessel and rotating the rod in response thereto and an indicator means operatively related to the first end of the rod for providing an indication of rotation of the rod in response to the engagement of the surface of the material within the vessel by the rigid member means. In accordance with another aspect of the invention, a process is provided for measuring the level of material within a rotating vessel wherein an apparatus is used comprising a rod aligned parallel with the axis of rotation of a rotating vessel and having a first end outside the rotating vessel and a second end inside the rotating vessel and having a rigid member means fixedly secured to the second end of the rod and an indicator means operatively related to the first end of the rod wherein the rigid member means engages the surface of the material within the rotating vessel and rotates the rod in response to the changes in the level of the material within the vessel and the indicator means provides an indication of the rotation of the rod in response to the engagement of the surface of the material by the rigid member means.

DETAILED DESCRIPTION OF THE INVENTION

The apparatus of the present invention can be used to measure the level of material within any rotating vessel. Preferably, however, the apparatus of the present invention is used to measure the level of a catalyst feedstream within a rotating calcination furnace.

Figure 1:
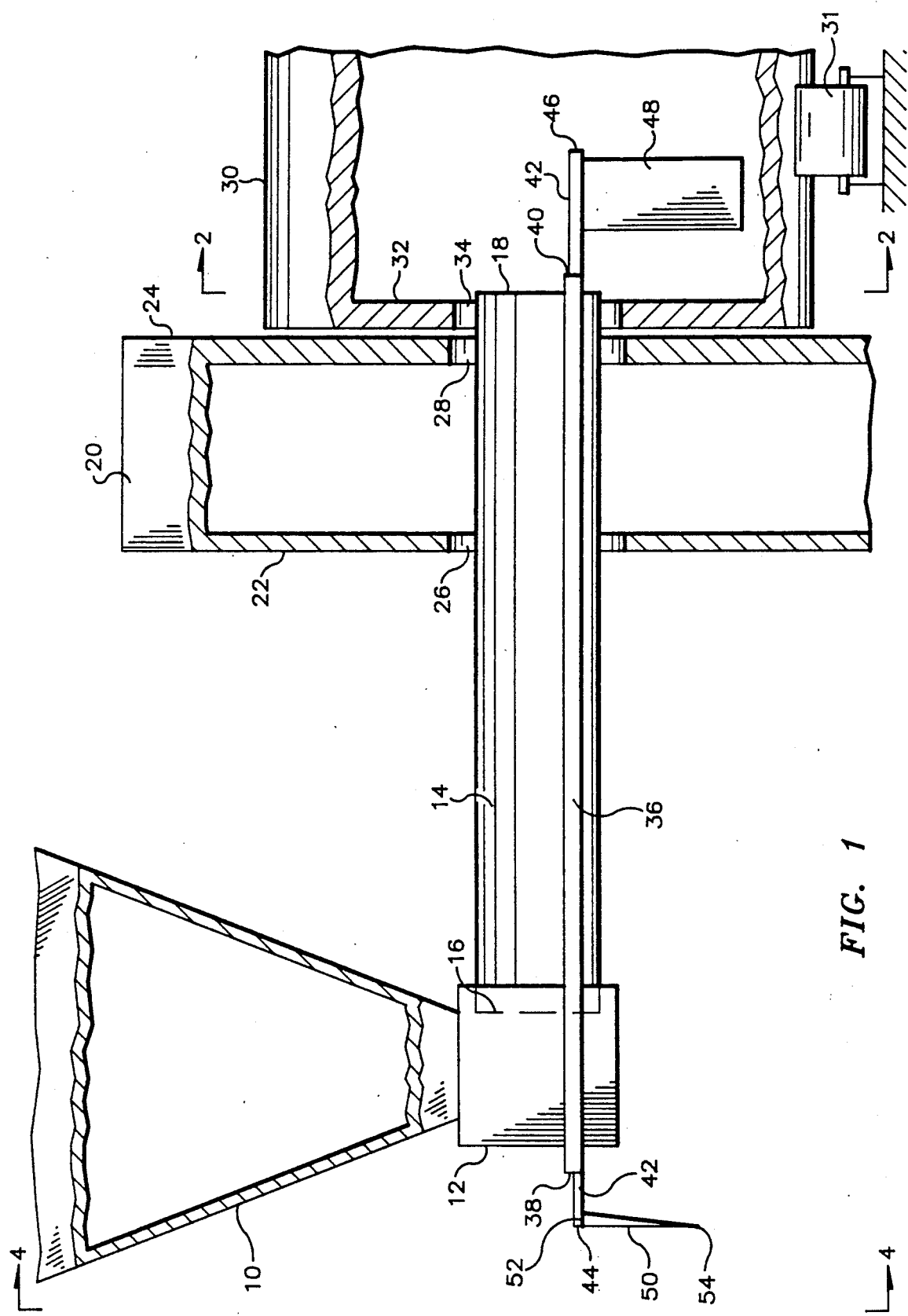
FIG. 1 is an elevation view of the material level indicator constructed in accordance with the invention attached to a rotary vessel furnace with portions cut away to more clearly illustrate the invention.

Referring to the drawings, and to FIG. 1 in particular, there is illustrated an elevation view of the inlet to a rotating calcination furnace with portions cut away to more clearly illustrate the present invention. A feed hopper 10 is fixedly secured to a vibratory feedbox 12. An orifice, not shown, at the lower end of the feed hopper 10 coincides with an orifice, not shown, at the upper end of the vibratory feedbox 12 so as to allow feed material to be gravity fed from the feed hopper 10 into the vibratory feed box 12. A feed inlet pipe 14 having a first end 16 and a second end 18 is fixedly secured to the vibratory feedbox 12 with the first end 16 extending through an opening, not shown, in one side wall of the vibratory feedbox 12, therefore allowing feed material to be passed from the vibratory feedbox 12 into and through the feed inlet pipe 14.

The feed inlet pipe 14 passes through a hood 20 having a first face 22 and a second face 24. The feed inlet pipe 14 enters the hood 20 through a first orifice 26 at the first face 22 and exits the hood 20 through a second orifice 28 at the second face 24.

A rotary vessel 30 is adjacent to the hood 20 with a first face 32 adjacent to the second face 24 of the hood 20. The first face 32 of the rotary vessel 30 has an orifice 34 through its center and aligned with the second orifice 28 of the hood 20. The feed inlet pipe enters the rotary vessel 30 through the orifice 34 so that the second end 18 of the feed inlet pipe 14 is within the rotary vessel 30. The rotary vessel 30 is supported by at least one roller 31. The roller 31 provides support for the rotary vessel 30 while also allowing rotation of the rotary vessel 30 about its rotational axis.

Adjacent to the feed inlet pipe 14 along a longitudinal axis parallel to the rotational axis of the rotary vessel 30 is a level indicator tube 36 having a first end 38 and a second end 40. The level indicator tube 36 enters the hood 20 through the first orifice 26 of the hood 20 and exits the hood 20 through the second orifice 28 and enters the rotary vessel 30 through the orifice 34 so that the second end 40 of the level indicator tube 36 is within the rotary vessel 30. The level indicator tube 36 is supported by any suitable means in rigid relation to the remainder of the structure. Preferably, the level indicator tube 36 is supported by a plurality of legs fixedly secured to the level indicator tube 36 between the first end 38 and the first face 22 of the hood 20 and extending downwardly to a base. Alternatively, the level indicator tube 36 can be fixedly secured to the feed inlet tube 14 by any suitable means, such as welding or clamping.

A level indicator rod 42 passes through the level indicator tube along the same longitudinal axis is that of the level indicator tube 36. The level indicator rod 42 has a circular cross-section with a diameter less than the inside diameter of the level indicator tube 36. The level indicator rod 42 has a first end 44 and a second end 46. The length of the level indicator rod 42 is greater than the length of the level indicator tube 36 so that the first end 44 of the level indicator rod 42 extends beyond the first end 38 of the level indicator tube 36 and the second end 46 of the level indicator rod 42 extends beyond the second end 40 of the level indicator tube 36 within the rotary vessel 30.

A thin plate 48 is fixedly secured to the level indicator rod 42 between the second end 46 of the level indicator 42 and the second end 40 of the level indicator tube 36. The plate 48 extends radially outward from the level indicator rod 42 so that the plate and the level indicator rod 42 are within the same plane. Generally, the length of the plate 38 is less than the length of the closest distance between the level indicator rod 42 and the inner wall of the rotary vessel 30. This length allows the level indicator rod to revolve a complete 360° without the plate catching on the inner surface of the rotary vessel 30.

In order for the level indicator to operate effectively, the plate 48 must rest at the surface of the material within the rotary vessel 30. Therefore, the width and thickness of the plate 48 must be such that the weight and surface area of the plate allow the plate to rest at the surface of the material within the rotary vessel 30 rather than sinking into the material. Although a plate is presently preferred, any rigid member means can be used that is capable of extending radially outward from the rod 42 and engaging upon the surface of the material within the rotating vessel 30.

A pointer 50 having a first end 52 and a second end 54 is fixedly secured at its first end 52 to the level indicator rod 42 between the first end 44 of the vessel indicator rod 42 and the first end 38 of the level indicator tube 36 and is unsupported at its second end 54. The pointer 50 extends radially outward from the level indicator rod 42. Preferably, the pointer 50 is perpendicular to the level indicator rod 42 and is within the same plane as the plate 48. Although a pointer is presently preferred, any indicator means can be used that is operatively related to the rod 42 to provide an indication of the rotation of the rod 42 in response to the engagement of the surface of the material within the rotating vessel 30 by the plate 48.

Figure 2:
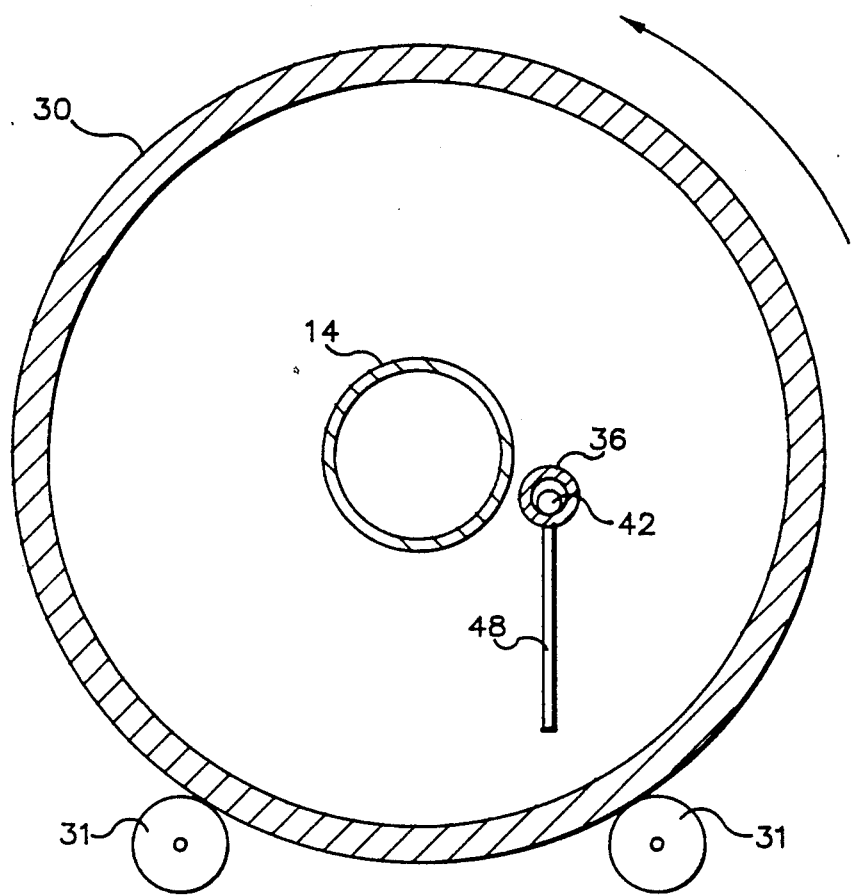
FIG. 2 is a cross-sectional view taken along line 2—2 of FIG. 1.

FIG. 2 is a cross-sectional view taken along 2—2 of FIG. 1. The rotary vessel 30 is rotating in a counterclockwise direction. The feed inlet tube 14 has the same center axis as the rotary vessel 30. The level indicator tube 36 has a center axis located below and to the right of the center axis of the rotary vessel 30 and the feed inlet tube 14. If the rotary vessel 30 has clockwise rotation rather than counterclockwise, the preferred location of the center axis of the level indicator tube 36 is below and to the left of the feed inlet tube 14. The level indicator tube 36 can be located anywhere within the rotary vessel 30, however, the above-described location is preferred to allow the plate 48 to set on the surface of the material within the rotary vessel 30.

The longitudinal axis of the level indicator rod 42 is within the level indicator tube 36. The level indicator rod 42 is capable of making a complete 360° rotation within the level indicator tube 36. The plate 48 extends radially outward from the level indicator rod 42. In FIG. 2, the rotary vessel 30 is shown with no material inside the rotary vessel. With no material inside the vessel, the plate 48 extend vertically downward due to the force of gravity.

Figure 3:
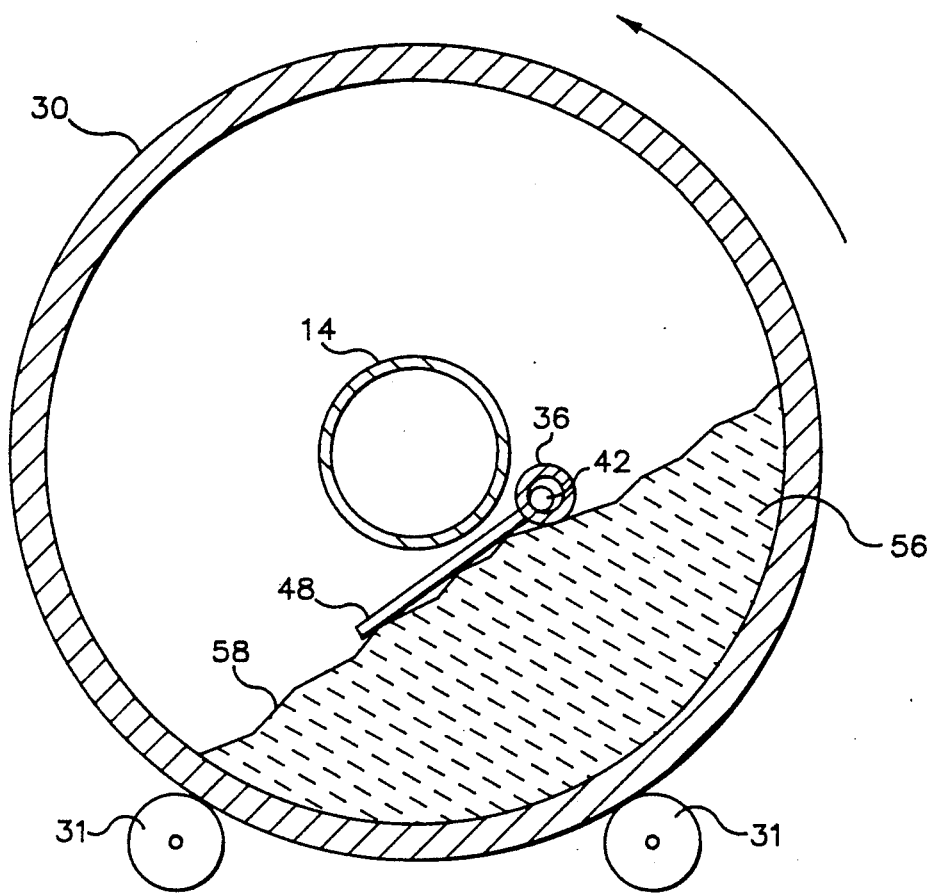
FIG. 3 is a cross-sectional view similar to FIG. 2 with a bed of material existing within the rotary vessel.

FIG. 3 shows a cross-sectional view similar to that shown in FIG. 2 with an amount of material within the rotary vessel 30. Because of the rotation of the rotary vessel 30, the material 56 will rotate with the inner surface of the rotary vessel 30 in a counterclockwise direction before being overcome by the force of gravity and falling downward toward the lower most area of the rotary vessel 30. This phenomenon is known as "folding" of the material. The plate 48 rotates so as to rest upon the upper most surface 58 of the material 56 and as a result rotates the level indicator rod 42 to which it is fixedly secured.

Figure 4:
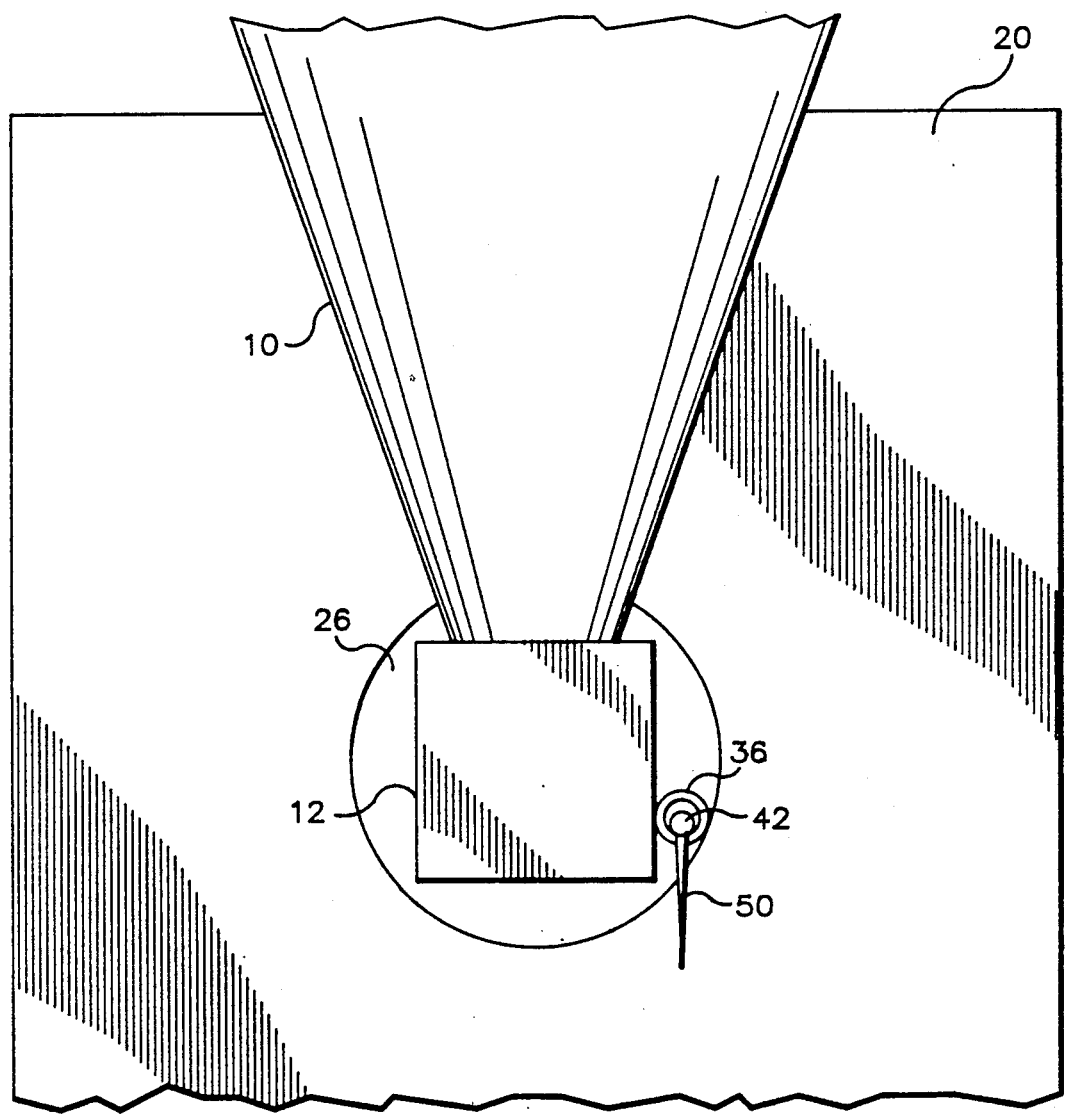
FIG. 4 is a cross-sectional view taken along line 4—4 of FIG. 1.

FIG. 4 is a side view taken along line 4—4 of FIG. 1 illustrating the positioning of the pointer 50. The level indicator tube 36 passes through the hood orifice 26 and along the side of the vibratory feederbox 12. The pointer 50 extends radially outward from the level indicator rod 42. The pointer 50 is capable of making a complete 360° about the longitudinal axis of the level indicator rod 42. In FIG. 4, the pointer 50 extends vertically downward from the level indicator rod 42. This position corresponds to the plate 48 position shown in FIG. 2 in which there is no material within the rotary vessel 30.

Figure 5:
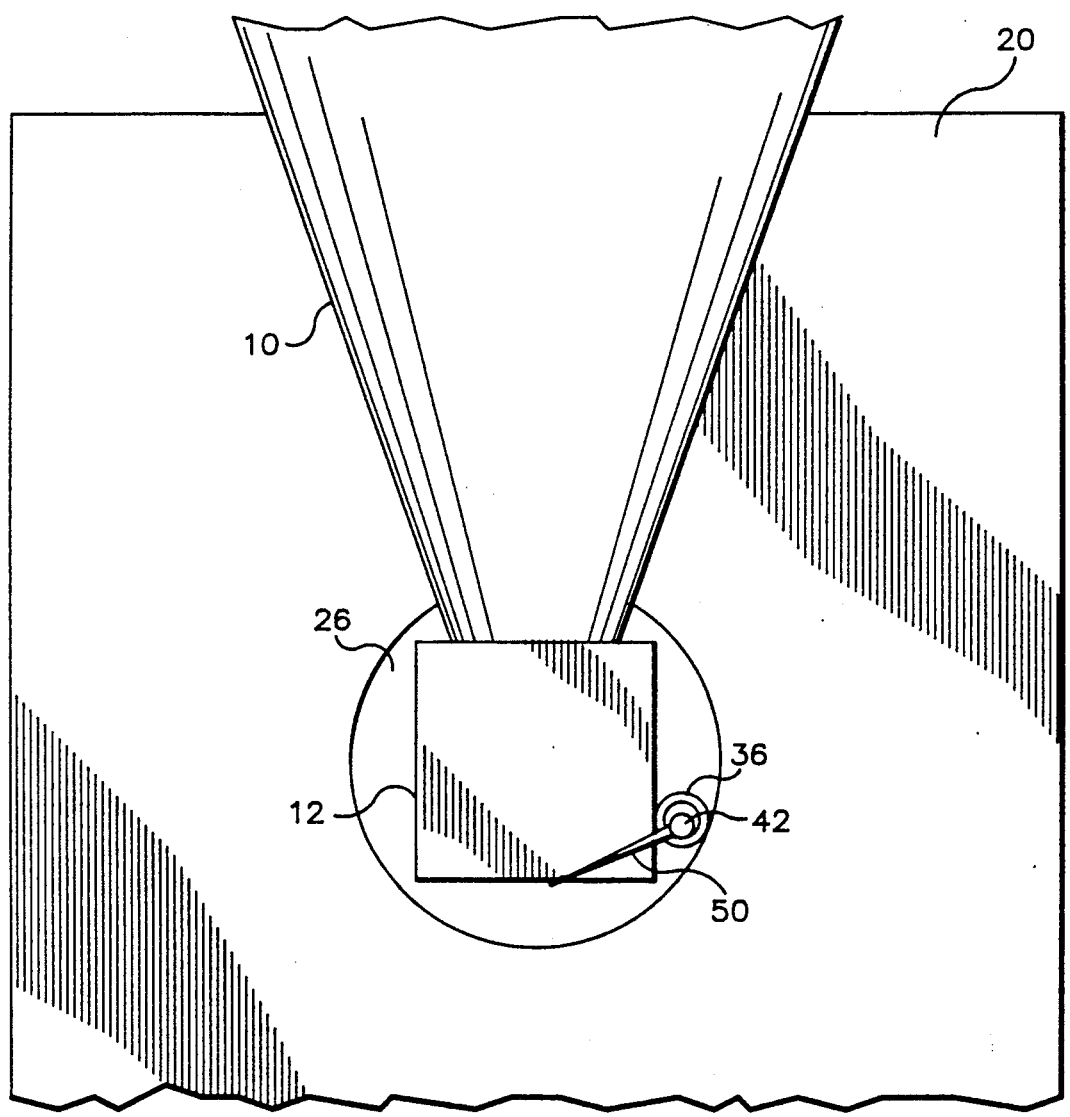
FIG. 5 is a cross-sectional view similar to FIG. 4 with the same level of material existing within the rotary vessel as shown in FIG. 3.

FIG. 5 is a side view similar to that in FIG. 4 illustrating the positioning of the pointer 50 with the same amount of material within the rotary vessel as shown in FIG. 3. The pointer 50 extends radially outward from the level indicator rod 42 at an angle between 0° and 90° downward from the horizontal. This angle is the same as that of the plate 48 of FIG. 3. This is because the pointer 50 and the plate 48 are both fixedly secured to the rod 42. Rotation of the plate 48 will always result in an equal rotation of the pointer 50.

The apparatus of the present invention can be used for any process in which material must be passed through a rotating vessel and there exists a need to determine the level of material within the rotating vessel, for example, a rotary furnace for the calcination of a feed material.

In accordance with one process of the present invention, feed material is gravity fed through a feed hopper 10 into a vibratory feedbox 12. The material is transferred from the vibratory feedbox 12 to the feed inlet tube 14 through the first end 16 of the feed inlet tube 14. The material exits the feed inlet tube 14 through its second end 18 and enters the rotary vessel 30.

The rotation of the rotary vessel causes "folding" of the material within the rotary vessel to occur. The plate 48 will revolve so as to rest at the surface of the material within the rotary vessel 30. The rotation of the plate 48 will result in a rotation of the level indicator rod 42 to which it is fixedly secured. The rotation of the level indicator rod 42 will result in an equal angle of rotation of the pointer 50. Visual observation of the pointer 50 will allow the level of material within the rotary vessel 30 to be determined based on the angle of rotation of the pointer 50. The observer can then control the feed flow into the rotary vessel 30 based upon the observed level within the rotary vessel 30 so as to avoid overflow of material from the rotary vessel 30 into the hood 20.

Preferably, the material fed into the rotary vessel comprises a catalyst feedstream; however, the material can comprise any material capable of supporting the plate 48 and capable of achieving a "folding" motion when inside a rotating vessel. The material within the rotating vessel can be at temperatures of up to 2000° F. and higher. The apparatus of the present invention is capable of operating at such high temperatures without the possibility of malfunction.

A detection means can be utilized to signal when the pointer 50 rotates to a particular position, thus signaling when an excessively high or low level of material exists within the rotary vessel 30. The detection means can be capable of automatically shutting off the rotary vessel apparatus when such excessive conditions exist.

It will be appreciated that the instant specification is set forth by way of illustration and not limitation, and that various modifications and changes may be made without departing from the spirit an scope of the present invention.

That which is claimed is:

1. An apparatus for measuring the level of material within a rotating vessel having an end wall and a rotational axis comprising:
   (a) a rod having a first and second end and having a longitudinal axis parallel to the rotational axis of said vessel wherein said rod is capable of rotation around its longitudinal axis and wherein said rod passes through an end wall of said vessel so that said first end of said rod is on the exterior of said vessel and said second end of said rod is on the interior of said vessel;
   (b) a rigid member means fixedly secured to said rod between said second end of said rod and said end wall of said vessel so as to extend radially outwardly from the longitudinal axis of said rod so that said rod lies substantially within the same plane as said rigid member for engaging the surface of material within said rotating vessel and rotating said rod in response thereto; and
   (c) an indicator means operatively related to said rod between the first end of said rod and said end wall for providing an indication of rotation of said rod in response to the engagement of the surface of said material by said member means.

2. An apparatus in accordance with claim 1, wherein said rigid member means comprises a flat plate.

3. An apparatus in accordance with claim 1, wherein said vessel comprises a rotary calcination furnace.

4. An apparatus in accordance with claim 1, wherein said vessel is substantially cylindrically shaped.

5. An apparatus in accordance with claim 1, wherein said indicator means comprises a pointer comprising a thin member having a first and second end wherein said first end is fixedly secured to said rod between said first end of said rod and said end wall of said vessel and wherein said pointer extends radially outwardly from said rod.

6. An apparatus in accordance with claim 2, wherein said pointer member is substantially perpendicular to the longitudinal axis of said rod and lies substantially within the same plane as said rigid member.

7. A method for measuring the amount of material within a rotating vessel having an end wall and a rotational axis and having a rod having a first and second end and a longitudinal axis parallel to the rotational axis of said vessel wherein said rod is capable of rotation around its longitudinal axis and wherein said rod passes through the end of said vessel so that said first end of said rod is on the exterior of said vessel and said second end of said rod is on the interior of said vessel, a rigid member fixedly secured to said rod between said second end of said rod and said end wall of said vessel so as to extend radially outwardly from the longitudinal axis of said rod so that said rod lies substantially within the same plane as said rigid member, and a indicator means operatively related to said rod between the first end of said rod and said end wall, wherein said method comprises:

passing said material through said rotating vessel so that said rigid member rests upon the surface of said material thereby resulting in rotation of said rigid member about the longitudinal axis of said rod as the level of the surface of said material in said vessel changes, wherein said rotation of said rigid member results in an equal rotation of said rod about the longitudinal axis of said rod, and wherein said indicator means provides an indication of the rotation of said rod in response to the engagement of the surface of said material by said member means.

8. A method in accordance with claim 7, wherein said rigid member means comprises a flat plate.

9. A method in accordance with claim 7, wherein said vessel comprises a rotary calcination furnace.

10. A method in accordance with claim 7, wherein said vessel is substantially cylindrically shaped.

11. A method in accordance with claim 7, wherein said material comprises a catalyst feedstream.

12. A method in accordance with claim 7, wherein said indicator means comprises a pointer comprising a thin member having a first end and a second end wherein said first end is fixedly secured to said rod between said first end of said rod and said end wall of said vessel and wherein said pointer extends radially outwardly from said rod.

13. A method in accordance with claim 8, wherein said pointer member is substantially perpendicular to said rod and within the plane of said rigid member.

14. An apparatus comprising:
   (a) a rotating vessel having an end wall and a rotational axis;
   (b) a rod having a first and second end and having a longitudinal axis parallel to the rotational axis of said vessel wherein said rod is capable of rotation around its longitudinal axis and wherein said rod passes through said end wall of said vessel so that said first end of said rod is on the exterior of said vessel and said second end of said rod is on the interior of said vessel;
   (c) a rigid member means fixedly secured to said rod between said second end of said rod and said end wall of said vessel so as to extend radially outwardly from the longitudinal axis of said rod so that said rod lies substantially within the same plane as said rigid member for engaging the surface of a material within said rotating vessel and rotating said rod in response thereto; and
   (d) an indicator means operatively related to said rod between said first end of said rod and said end wall for providing an indication of rotation of said rod in response to the engagement of the surface of a material within said rotating vessel by said member means.

15. An apparatus in accordance with claim 14, wherein said rigid member means comprises a flat plate.

16. An apparatus in accordance with claim 14 wherein said rotating vessel comprises a rotary calcination furnace.

17. An apparatus in accordance with claim 14, wherein said rotating vessel is substantially cylindrically shaped.

18. An apparatus in accordance with claim 14, wherein said indicator means comprises a pointer comprising a thin member having a first and second end wherein said first end is fixedly secured to said rod between said first end of said rod and said end wall of said rotating vessel and wherein said pointer extends radially outwardly from said rod.

19. An apparatus in accordance with claim 18, wherein said pointer member is substantially perpendicular to the longitudinal axis of said rod and lies substantially within the same plane as said rigid member means.

* * * * *

UNITED STATES PATENT AND TRADEMARK OFFICE
CERTIFICATE OF CORRECTION

PATENT NO. : 5,048,333

DATED : September 17, 1991

INVENTOR(S) : James G. Wolfe, et al

It is certified that error appears in the above-identified patent and that said Letters Patent is hereby corrected as shown below:

In Column 3, at line 29, the word "pocklets" should read --- pockets ---

In Column 4, at line 51; Column 6, at line 12; and Column 7, line 33, after the phrase "cheek plates" insert the number --- 11 ---.

In Column 4, at line 58, replace the phrase "!3" with the number --- 13 ---.

In Column 7, at line 64, after the word "be" insert --- stationary, the guide rods are in relative motion as the ---.

In Column 9, at line 36, after the phrase "with a" insert --- channel on said first roll as a second side, and the guide ---.

Signed and Sealed this

Sixteenth Day of February, 1993

Attest:

STEPHEN G. KUNIN

Attesting Officer

Acting Commissioner of Patents and Trademarks